United States Patent
Andrade Silva et al.

(10) Patent No.: US 9,542,386 B2
(45) Date of Patent: Jan. 10, 2017

(54) ENTAILMENT EVALUATION DEVICE, ENTAILMENT EVALUATION METHOD, AND RECORDING MEDIUM

(71) Applicant: NEC Corporation, Minato-ku, Tokyo (JP)

(72) Inventors: Daniel Georg Andrade Silva, Tokyo (JP); Kai Ishikawa, Tokyo (JP); Masaaki Tsuchida, Tokyo (JP); Takashi Onishi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/769,866

(22) PCT Filed: Feb. 28, 2014

(86) PCT No.: PCT/JP2014/055047
§ 371 (c)(1),
(2) Date: Aug. 24, 2015

(87) PCT Pub. No.: WO2014/133127
PCT Pub. Date: Sep. 4, 2014

(65) Prior Publication Data
US 2016/0012034 A1    Jan. 14, 2016

(30) Foreign Application Priority Data

Feb. 28, 2013 (JP) .................................. 2013-039208

(51) Int. Cl.
*G06F 17/27* (2006.01)

(52) U.S. Cl.
CPC ......... *G06F 17/279* (2013.01); *G06F 17/2705* (2013.01); *G06F 17/2785* (2013.01)

(58) Field of Classification Search
CPC    G06F 17/2785; G06F 17/2235; G06F 17/278; G06F 17/2705; G06F 17/271
(Continued)

(56) References Cited

U.S. PATENT DOCUMENTS 8,554,542 B2* 10/2013 Sandor ............... G06F 17/2785
704/1
2011/0231430 A1* 9/2011 Sawayanagi ...... G06F 17/30634
707/769

FOREIGN PATENT DOCUMENTS

WO    2012053175 A1    4/2012

OTHER PUBLICATIONS

International Search Report for PCT Application No. PCT/JP2014/055047, mailed on Jun. 3, 2014.
(Continued)

*Primary Examiner* — Charlotte M Baker

(57) ABSTRACT

An entailment evaluation device includes: a generation unit which generates first information indicating at least the order of occurrence of events of first and second simple sentences included in the hypothesis text and generates second information indicating at least the order of occurrence of events of third and fourth simple sentences included in a target text, the third simple sentence being related to the first simple sentence, the fourth simple sentence being related to the second simple sentence; a calculation unit which obtains a calculation result by comparing, based on the first and second information, the order of occurrence of events of first and second simple sentences and order of occurrence of events of third and fourth simple sentences; and a determination unit which determines, based on at least the calculation result, whether or not the target text entails the hypothesis text.

10 Claims, 7 Drawing Sheets

(58) Field of Classification Search
USPC .................... 704/1, 2, 3, 4, 5, 6, 7, 8, 9, 10
See application file for complete search history.

(56) References Cited

OTHER PUBLICATIONS

English translation of Written opinion for PCT Application No. PCT/JP2014/055047.
Wang et al., Recognizing Textual Relatedness with Predicate-Argument Structures, Proceeding of the Conference on Empirical Methods in Natural Language Proceeding (2009).
Haghighi et al., Robust Textual Inference via Graph Matching, Proceedings of the Conference on Human Language Technology and Empirical Methods in Natural Language Proceeding (2005).
Masatsugu Tonoike et al., "LFG Kaiseki o Riyo shita Nihongo Gan'i Kankei Hantei ni Okeru Kino Hyogen no Toriatsukai", Proceedings of the 15th annual meeting of the Association for Natural Language Processing, Mar. 2, 2009 (Mar. 2, 2009), pp. 376 to 379.
Kunihiro Udaka et al., "n-gram o Mochiita Nihongo Text Gan'i Ninshiki no Ken to",Proceedings of the 16th annual meeting of the Association for Natural Language Processing, Mar. 8, 2010 (Mar. 8, 2010), pp. 462 to 465.

\* cited by examiner

DISCOURSE RELATIONSHIP DISTANCE = 1

DISCOURSE RELATIONSHIP DISTANCE = 0

DISCOURSE RELATIONSHIP DISTANCE = 2

DISCOURSE RELATIONSHIP DISTANCE = 0

ENTAILMENT EVALUATION DEVICE, ENTAILMENT EVALUATION METHOD, AND RECORDING MEDIUM

This application is a National Stage Entry of PCT/JP2014/055047 filed on Feb. 28, 2014, which claims priority from Japanese Patent Application 2013-039208 filed on Feb. 28, 2013, the contents of all of which are incorporated herein by reference, in their entirety.

TECHNICAL FIELD

The present invention relates to an entailment evaluation device, an entailment evaluation method, and a program.

BACKGROUND ART

There is known a technology called RTE (Recognizing Textual Entailment). This is a technology that determines whether or not a given target text entails a hypothesis text. NPL 1 discloses a technology that divides the target text and hypothesis text into predicate-argument structures and performs entailment evaluation based on a distance between the structures. NPL 2 discloses a technology that performs comparison by using a graph structure of a whole sentence in place of the division into predicate-argument structures.

That is, the technologies disclosed in NPL 1 and NPL 2 evaluates entailment. It is performed by determining whether or not a plurality of simple sentences similar in meaning, respectively, to a plurality of simple sentences included in the hypothesis text are included in the target text.

CITATION LIST

Non Patent Literature

[NPL 1] Wang et al., Recognizing Textual Relatedness with Predicate-Argument Structures, Proceeding of the Conference on Empirical Methods in Natural Language Proceeding (2009)

[NPL 2] Haghighi et al., Robust Textual Inference via Graph Matching, Proceedings of the Conference on Human Language Technology and Empirical Methods in Natural Language Proceeding (2005)

SUMMARY OF INVENTION

Technical Problem

However, even when the plurality of simple sentences included in the hypothesis text coincides with the simple sentences included in the target text, there may be a case where the target text does not entail the hypothesis text. For example, in the case of a discourse relationship between the simple sentences of the target text and hypothesis text differs from each other. The discourse relationship is a relationship indicating a relationship between one simple sentence and another simple sentence in terms of role, such as a temporal before-after relationship, a causal relationship, or a paraphrase relationship or a relationship indicating a transition of topics.

Here, an example where a target text T1 "Peter drank a glass of water, and afterwards went out of the room." and a hypothesis text T2 "Peter left the room, and then drank something." are compared will be described. The target text T1 includes a simple sentence T11 "Peter drank a glass of water." and a simple sentence T12 "Peter went out of the room." The hypothesis text T2 includes a simple sentence T21 "Peter left the room." and a simple sentence T22 "Peter drank something."

The simple sentence T11 and simple sentence T22 have a similar relationship to each other. The simple sentence 12 and simple sentence T21 have a similar relationship to each other. In this case, when the technology described in NPL 1 or NPL 2 is applied, it is determined that the target text T1 entails the hypothesis text T2. However, "Peter went out of (left) the room." of the hypothesis text T2 and "Peter drank a glass of water (something)." differ from each other in terms of chorological order. Thus, actually, the target text T1 does not entail the hypothesis text T2.

An example of an object of the present invention is to provide an entailment evaluation device, an entailment evaluation method, and a program capable of solving the above-described problem.

Solution to Problem

An entailment evaluation device according to exemplary embodiments of the present invention includes: a generation unit which generates first information indicating at least the order of occurrence of events of first and second simple sentences included in the hypothesis text and generates second information indicating at least the order of occurrence of events of third and fourth simple sentences included in a target text, the third simple sentence being related to the first simple sentence, the fourth simple sentence being related to the second simple sentence; a calculation unit which obtains a calculation result by comparing, based on the first and second information, the order of occurrence of events of first and second simple sentences and order of occurrence of events of third and fourth simple sentences; and a determination unit which determines, based on at least the calculation result, whether or not the target text entails the hypothesis text.

The above entailment evaluation device may further include an extraction unit which extracts, as the third simple sentence, a simple sentence similar in meaning to the first simple sentence from the target text.

The above entailment evaluation device may further include a division unit which obtains, by dividing the hypothesis text, a plurality of simple sentences, including the first and second simple sentences, each having one predicate and obtains, by dividing the target text, a plurality of simple sentences, including the third and fourth simple sentences, each having one predicate.

The above entailment evaluation device may further include a storage unit which stores a first conjunction and the order of occurrence of events of simple sentences connected by the first conjunction in association with each other. The generation unit may determine whether or not the first conjunction and a second conjunction connecting the first and second simple sentences are identical and make, when determining that the first and second conjunctions are identical, the order of the first and second simple sentences in the first information coincide with the order of occurrence of an event associated with the first conjunction.

The above entailment evaluation device may further include a storage unit which stores a first conjunction and the order of occurrence of events of simple sentences connected by the first conjunction in association with each other. The generation unit may determine whether or not the first conjunction and a second conjunction connecting the third and fourth simple sentences are identical and make, when determining that the first and second conjunctions are identical, the order of the third and fourth simple sentences in the second information coincide with the order of occurrence of an event associated with the first conjunction.

In the above entailment evaluation device, the extraction unit may identify a first simple sentence distance between the first and third simple sentences and a second simple sentence distance between the second and fourth simple sentences. The determination unit may determine, based on at least the calculation result and first and second simple sentence distances, whether or not the target text entails the hypothesis text.

The above entailment evaluation device may further include a simple sentence distance calculation unit which calculates a first similarity in meaning between the first and third simple sentences and a second similarity in meaning between the second and fourth simple sentences. The calculation unit may determine whether or not the event of the second simple sentence occurs before the event of the first simple sentence and the event of the fourth simple sentence occurs after the event of the third simple sentence. The determination unit may determine, when the first and second similarities are high, the event of the second simple sentence occurs before the event of the first simple sentence, and the event of the fourth simple sentence occurs after the event of the third simple sentence, that the target text does not entail the hypothesis text.

An entailment evaluation method according to the exemplary embodiments of the present invention includes: generating first information indicating at least the order of occurrence of events of first and second simple sentences included in the hypothesis text; generating second information indicating at least the order of occurrence of events of third and fourth simple sentences included in a target text, the third simple sentence being related to the first simple sentence, the fourth simple sentence being related to the second simple sentence; obtaining a calculation result by comparing, based on the first and second information, the order of occurrence of events of first and second simple sentences and order of occurrence of events of third and fourth simple sentences; and determining, based on at least the calculation result, whether or not the target text entails the hypothesis text.

A program according to the exemplary embodiments of the present invention allows a computer to execute: generating first information indicating at least the order of occurrence of events of first and second simple sentences included in the hypothesis text; generating second information indicating at least the order of occurrence of events of third and fourth simple sentences included in a target text, the third simple sentence being related to the first simple sentence, the fourth simple sentence being related to the second simple sentence; obtaining a calculation result by comparing, based on the first and second information, the order of occurrence of events of first and second simple sentences and order of occurrence of events of third and fourth simple sentences; and determining, based on at least the calculation result, whether or not the target text entails the hypothesis text.

A non-transitory recording medium according to the exemplary embodiments of the present invention stores the above program.

Advantageous Effects of Invention

According to the exemplary embodiments of the present invention, it is possible to determine that target text does not entail the hypothesis text when the discourse relationship between the simple sentences of the hypothesis text and the discourse relationship between the simple sentences of the target text are not similar.

DESCRIPTION OF EMBODIMENTS

<First Exemplary Embodiment>

Hereinafter, exemplary embodiments of the present invention will be described in detail with reference to the drawings.

Figure 1:
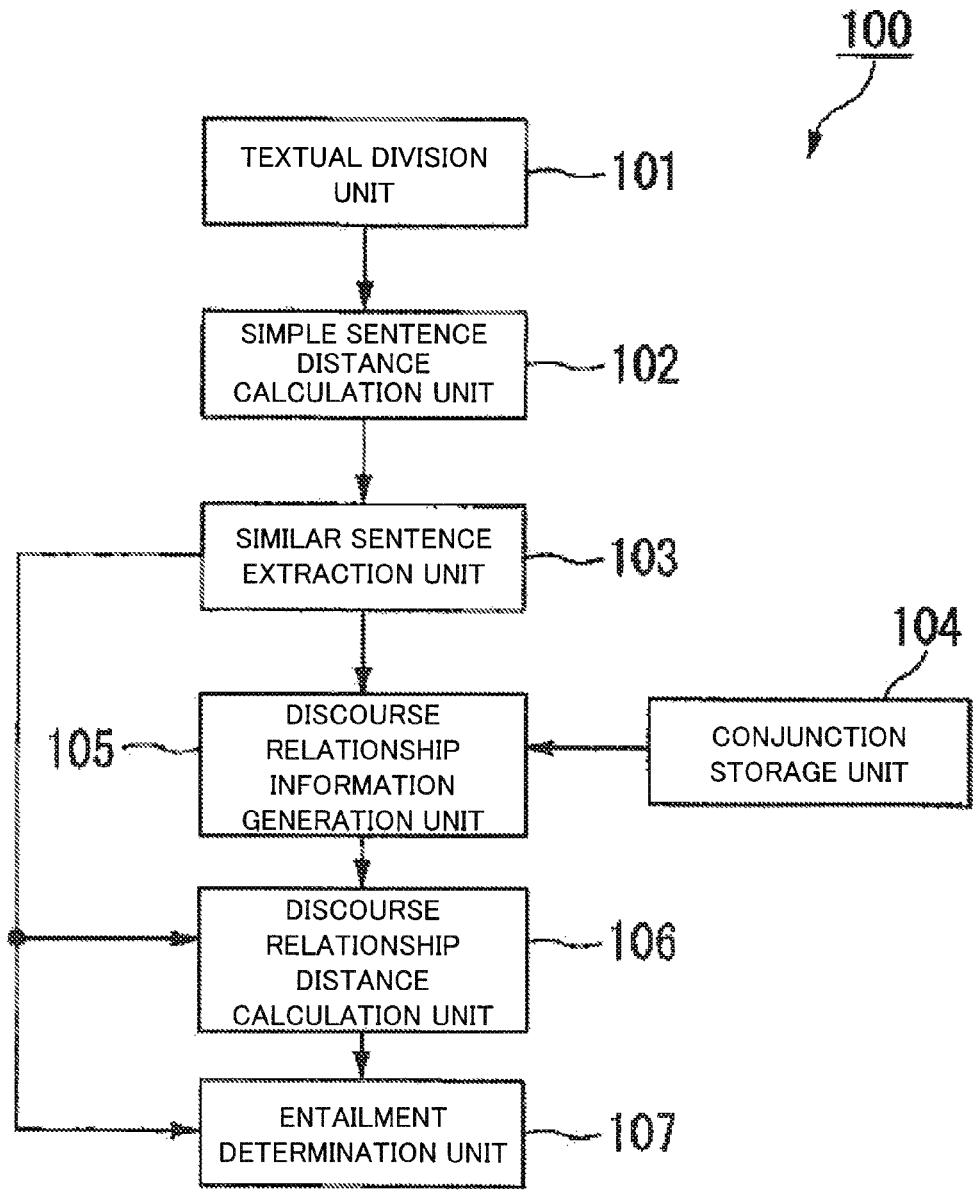
FIG. 1 is a schematic block diagram illustrating a configuration of an entailment evaluation device according to a first exemplary embodiment of the present invention.

FIG. 1 is a schematic block diagram illustrating a configuration of an entailment evaluation device 100 according to a first exemplary embodiment of the present invention.

The entailment evaluation device 100 is a device that analyzes a given target text and a given hypothesis text to determine whether the target text entails the hypothesis text. The target text and hypothesis text each may be a complex sentence having a plurality of predicates or may be a text including a plurality of sentences including a simple sentence. The entailment evaluation device 100 according to the first exemplary embodiment includes a textual division unit 101, a simple sentence distance calculation unit 102, a similar sentence extraction unit 103, a conjunction storage unit 104, a discourse relationship information generation unit 105, a discourse relationship distance calculation unit 106, and an entailment determination unit 107.

The textual division unit 101 is sometimes referred to merely as "division unit 101". The simple sentence distance calculation unit 102 is sometimes referred to merely as "first calculation unit 102". The similar sentence extraction unit 103 is sometimes referred to merely as "extraction unit 103". The conjunction storage unit 104 is sometimes referred to merely as "storage unit 104". The discourse relationship information generation unit 105 is sometimes referred to merely as "generation unit 105". The discourse relationship distance calculation unit 106 is sometimes referred to merely as "second calculation unit 106". The entailment determination unit 107 is sometimes referred to merely as "determination unit 107".

The division unit 101 divides, based on predicate-argument analysis and co-reference analysis, the hypothesis text and target text into a plurality of simple sentences each having one predicate. At this time, the division unit 101 replaces a pronoun in the simple sentence with a noun in a source sentence by anaphoric analysis. Further, the division unit 101 adds an adequate noun when the simple sentence includes no pronoun. Thus, the division unit 101 divides the complex sentence into simple sentences. Here, an example in which the simple sentence includes no pronoun will be described. For example, the text "Taro ate an apple, and put (the apple) into a trash box." can be simply divided into a simple sentence "Taro ate an apple." and a simple sentence "Taro put (the apple) into a trash box." In Japanese, in the simple sentence "Taro put (the apple) into a trash box.", an object (object of the verb "put") is sometimes omitted. In such a case, the division unit 101 adds the object "apple" to the simple sentence "Taro put (the apple) into a trash box." by anaphoric analysis to generate the simple sentence "Taro put the apple into a trash box."

The first calculation unit 102 calculates, for each simple sentence of the hypothesis and target texts obtained by division performed by the division unit 101, a simple sentence distance indicating a distance (cost) in meaning between the simple sentence of the hypothesis text and simple sentence of the target text. In the present exemplary embodiment, the simple sentence distance can assume a value equal to or larger than 0 and equal to or smaller than 1, and the closer the value is to 0, the higher the similarity. The first calculation unit 102 calculates the simple sentence distance based on a word overlapping rate or synonym dictionary information. For example, the first calculation unit 102 may determine that the simple sentence distance is 0 when all the words in the simple sentences of the hypothesis and target texts coincide with each other. The first calculation unit 102 may determine that the simple sentence distance is 0.5 when synonyms or words with similar meaning are included. Otherwise, the first calculation unit 102 may determine that the simple sentence distance is 1.

The extraction unit 103 extracts, from the simple sentences constituting the target text, a simple sentence thereof similar in meaning to the simple sentence of the hypothesis text based on the simple sentence distance calculated by the first calculation unit 102. The extraction unit 103 uses, e.g., Hungarian Algorithm to extract a combination of the simple sentences having a minimum simple sentence distance to thereby extract the simple sentence of the target text related to the simple sentence of the hypothesis text. Based on a result of the calculation from the first calculation unit 102, the extraction unit 103 identifies, for each extracted simple sentence, the simple sentence distance between the extracted simple sentence and simple sentence of the hypothesis text related to the extracted simple sentence.

The storage unit 104 stores therein a conjunction connecting the simple sentences and a discourse relationship indicated by the conjunction in association with each other. For example, the storage unit 104 stores therein a conjunction "after" and a discourse relationship indicated by the "after" in association with each other. That is, the storage unit 104 stores therein the conjunction "after" and 'an event indicated by a simple sentence appearing immediately after the "after" occurs before an event indicated by a simple sentence appearing immediately before the "after"' in association with each other.

The generation unit 105 generates discourse relationship information indicating a discourse relationship between simple sentences of the hypothesis text and between simple sentence extracted by the extraction unit 103. Specifically, the generation unit 105 generates an array in which the simple sentences are arranged in the order appearing in the text. Then, the generation unit 105 rearranges the array based on the discourse relationship that the storage unit 104 stores in association with the conjunction connecting the simple sentences, to thereby generate the discourse relationship information. For example, when generating discourse relationship information of a text "A after B", the generation unit 105 first generates an array in which a simple sentence "A" and a simple sentence "B" are arranged in this order. The conjunction "after" between the simple sentences A and B indicates that an event indicated by the "B" occurs before an event indicated by the "A". Thus, the generation unit 105 reverses the order of the "A" and "B" in the array to thereby generate the discourse relationship information.

The same applies to a conjunction indicating a causal relationship. For example, a conjunction "because" indicates a discourse relationship indicating that 'an event indicated by a simple sentence appearing immediately before the "because" occurs due to an event indicated by a simple sentence appearing immediately after the "because"'. Thus, when generating discourse relationship information of a text "A because B", the generation unit 105 reverses the order of a simple sentence "A" and a simple sentence "B" arranged in this order in the array to thereby generate the discourse relationship information.

When a conjunction between simple sentences A and B is a conjunction ("in other words", etc.) indicating a paraphrase relationship, the generation unit 105 preferably stores simple sentences A and B in the same index.

The second calculation unit 106 calculates, based on the discourse relationship information generated by the generation unit 105, a discourse relationship distance. This distance shows discourse relationship between each simple sentence of the hypothesis text and each simple sentence extracted by the extraction unit 103. Specifically, the second calculation unit 106 refers to the discourse relationship information generated by the generation unit 105, i.e., discourse relationship information between the simple sentences of the hypothesis text and the discourse relationship information between the simple sentences extracted by the extraction unit 103. By using the reference result, the second calculation unit 106 calculates the number of crossing points between related simple sentences as a discourse relationship distance.

The determination unit 107 determines, based on the simple sentence distance of each simple sentence identified by the extraction unit 103 and discourse relationship distance calculated by the second calculation unit 106, whether or not the target text entails the hypothesis text. When a total sum of the simple sentence distances and discourse relationship distances is less than a predetermined threshold, the determination unit 107 can determine that the target text entails the hypothesis text.

The following describes operation of the entailment evaluation device 100 according to the first exemplary embodiment of the present invention.

Figure 2:
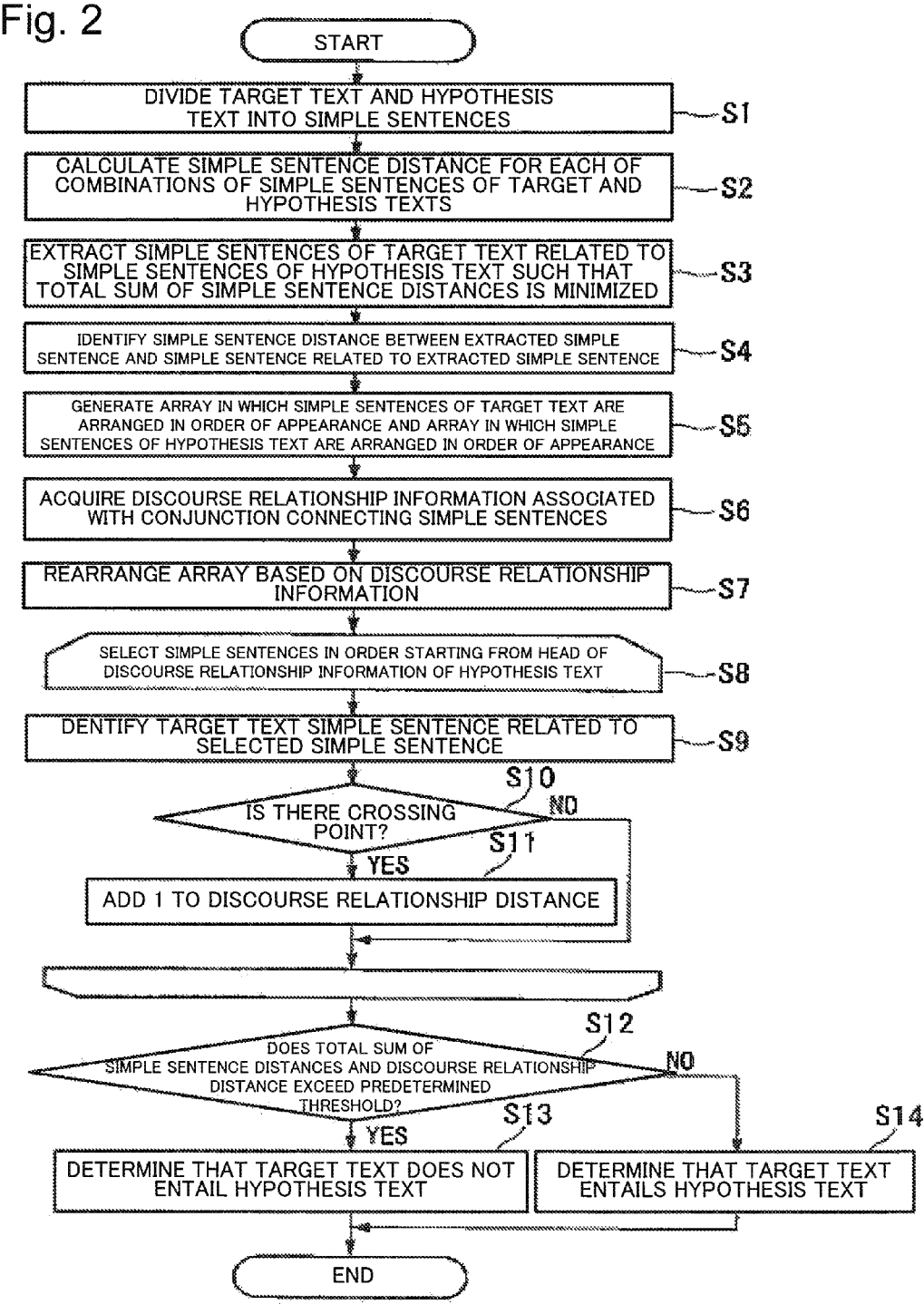
FIG. 2 is a flowchart illustrating operation of the entailment evaluation device according to the first exemplary embodiment of the present invention.

FIG. 2 is a flowchart illustrating operation of the entailment evaluation device 100 according to the first exemplary embodiment of the present invention.

When the entailment evaluation device 100 receives an input of the hypothesis text and target text, the division unit 101 divides the received hypothesis text and target text into a plurality of simple sentences (step S1). Then, the first calculation unit 102 calculates, for all the combinations of the simple sentences of the hypothesis and target texts, the simple sentence distance (step S2).

The extraction unit 103 extracts the simple sentences of the target text related to the simple sentences of the hypothesis text (step S3). At this time, the extraction unit 103 extracts the simple sentences from the target text such that a total sum of the simple sentence distances between the simple sentences of the hypothesis text and simple sentences of the target text is minimized. Then, the extraction unit 103 identifies, for all the combinations of the simple sentences of the hypothesis text and extracted text, the simple sentence distance calculated by the first calculation unit 102 (step S4).

The generation unit 105 generates an array in which the simple sentences of the hypothesis text are arranged in the order appearing in the hypothesis text. Further, the generation unit 105 generates an array in which the simple sentences of the target text are arranged in the order appearing in the target text (step S5). Then, the generation unit 105 acquires, from the storage unit 104, the discourse relationship associated with a conjunction connecting the simple sentences of the hypothesis text and discourse relationship associated with a conjunction connecting the simple sentences of the target text (step S6).

The generation unit 105 rearranges, based on the acquired discourse relationship, the array including the simple sentences of the hypothesis text to generate the discourse relationship information of the hypothesis text. The generation unit 105 rearranges, based on the acquired discourse relationship, the array including the simple sentences of the target text to generate the discourse relationship information of the target text (step S7).

The second calculation unit 106 selects the simple sentences in the order starting from a head of the discourse relationship information of the hypothesis text and executes steps S9 to S11 described below (step S8).

The second calculation unit 106 identifies, from among the simple sentences extracted by the extraction unit 103, a simple sentence related to the selected simple sentence (step S9). Then, the second calculation unit 106 determines whether or not there exists, from among simple sentences stored after the simple sentence identified in step S9 in the discourse relationship information of the target text, a simple sentence related to a simple sentence stored before the simple sentence selected in step S8 in the discourse relationship information of the hypothesis text. That is, the second calculation unit 106 determines, for the simple sentence selected in step S8, whether there is a crossing point between the hypothesis and target texts, where the discourse relationship thereof cross each other (step S10).

When determining, for the simple sentence selected in step S8, that there is a crossing point between the hypothesis and target texts, where the discourse relationship thereof cross each other (YES in step S10), the second calculation unit 106 adds 1 to the discourse relationship distance (step S11). Note that an initial value of the discourse relationship distance is 0. On the other hand, when determining, for the simple sentence selected in step S8, that there is no crossing point between the hypothesis and target texts, where the discourse relationship thereof cross each other (NO in step S10), the second calculation unit 106 does not change the value of the discourse relationship distance.

The processing of steps S8 to S11 are executed for all the simple sentences in the discourse relationship information of the hypothesis text. Thereafter, the determination unit 107 determines whether or not a value obtained by adding the total sum of the simple sentence distances identified by the extraction unit 103 and discourse relationship distance calculated by the second calculation unit 106 exceeds a predetermined threshold (e.g., 1) (step S12). When determining that a value obtained by adding the total sum of the simple sentence distances and discourse relationship distance exceeds a predetermined threshold (YES in step S12), the determination unit 107 determines that the target text does not entail the hypothesis text (step S13). On the other hand, when determining that a value obtained by adding the total sum of the simple sentence distances and discourse relationship distance does not exceeds a predetermined threshold (NO in step S12), the determination unit 107 determines that the target text entails the hypothesis text (step S14).

As described above, the entailment evaluation device 100 according to the first exemplary embodiment determines, based on the discourse relationship distance, whether or not the target text entails the hypothesis text. Thus, when the discourse relationship between the simple sentences of the target text and that between the simple sentences of the hypothesis text is not similar to each other, the entailment evaluation device 100 can determine that the target text does not entail the hypothesis text.

Further, the entailment evaluation device 100 according to the first exemplary embodiment acquires, from the storage unit 104, the discourse relationship associated with the conjunction connecting the simple sentences. Then, the entailment evaluation device 100 rearranges the appearance order of the simple sentences based on the discourse relationship to thereby generate the discourse relationship information. Thus, even when the appearing order of the simple sentences and order of the events differ from each other, the entailment evaluation device 100 can adequately perform the entailment evaluation.

As a specific example, a target text T1 "When the sun shines, then the grass dries." and a hypothesis text T2 "The grass dries because of the sun shining." are compared. The target text T1 includes a simple sentence T11 "The sun shines." and a simple sentence T12 "The grass dries." The hypothesis text T2 includes a simple sentence T21 "The grass dries." and a simple sentence T22 "The sun shines." Here, the storage unit 104 stores a conjunction "then" and discourse relationship indicating that 'an event indicated by a simple sentence appearing immediately after the "then" occurs after an event indicated by a simple sentence appearing immediately before the "then"' in association with each other. Further, the storage unit 104 stores a conjunction "because" and discourse relationship indicating that 'an event indicated by a simple sentence appearing immediately before the "because" occurs due to an event indicated by a simple sentence appearing immediately after the "because"' in association with each other. Thus, the generation unit 105 does not rearrange the discourse relationship information of the target text T1 and reverses the order of the simple sentences T21 and T22 of the discourse relationship information of the hypothesis text T2.

The second calculation unit 106 determines that there is no crossing point of the discourse relationship between the target text T1 and hypothesis text T2. Thus, the determination unit 107 can determine that the target text T1 entails the hypothesis text T2.

The following describes a specific example of the processing of steps S8 to S10.

Figure 3:
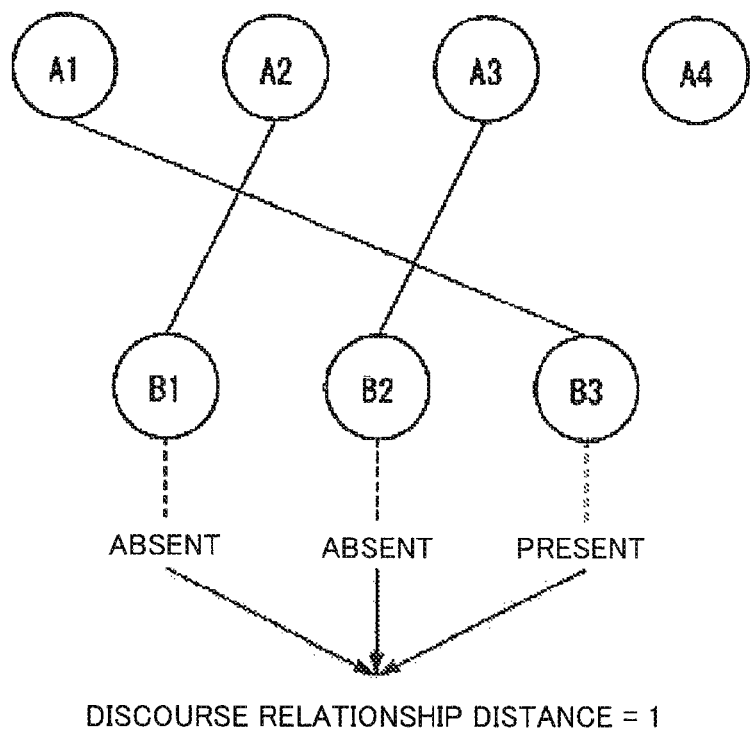
FIG. 3 is a view illustrating a first specific example of a calculation method for a discourse relationship distance in the first exemplary embodiment of the present invention.

FIG. 3 is a view illustrating a first specific example of a calculation method for the discourse relationship distance in the first exemplary embodiment of the present invention.

In the first specific example, the discourse relationship information of the target text stores simple sentences A1, A2, A3, and A4 in this order from a head thereof. The discourse relationship information of the hypothesis text stores simple sentences B1, B2, and B3 in this order from a head thereof. The simple sentence B1 is related to the simple sentence A2. The simple sentence B2 is related to the simple sentence A3. The simple sentence B3 is related to the simple sentence A1.

In this case, the second calculation unit 106 selects the simple sentence B1 in step S8. The simple sentence B1 is a head simple sentence in the discourse relationship information of the hypothesis text, so that there is no simple sentence that is stored before the simple sentence selected in step S8. Thus, the second calculation unit 106 determines in step S10 that there is no crossing point for the simple sentence B1.

Then, the second calculation unit 106 selects the simple sentence B2 in step S8. In the discourse relationship information of the target text, the simple sentence A4 is stored after the simple sentence A3 related to the simple sentence B2. In the discourse relationship information of the hypothesis text, the simple sentence B1 is stored before the simple sentence B2. There is no correspondence relationship between the simple sentences A4 and B1. Thus, the second calculation unit 106 determines in step S10 that there is no crossing point for the simple sentence B2.

Then, the second calculation unit 106 selects the simple sentence B3 in step S8. In the discourse relationship information of the target text, the simple sentences A2, A3, and A4 are stored after the simple sentence A1 related to the simple sentence B3. In the discourse relationship information of the hypothesis text, the simple sentences B1 and B2 are stored before the simple sentence B3. In this example, the simple sentences A2 and B1 and simple sentences A3 and B2 each have a correspondence relationship. Thus, the second calculation unit 106 determines in step S10 that there is a crossing point for the simple sentence B3 and adds 1 to the discourse relationship distance.

That is, the discourse relationship distance in the first specific example is 1.

Figure 4:
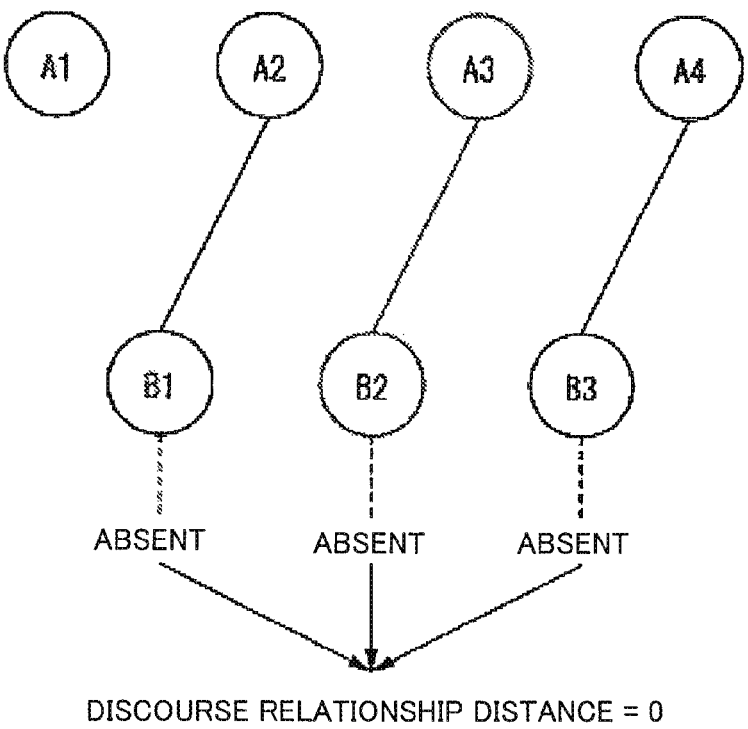
FIG. 4 is a view illustrating a second specific example of the calculation method for the discourse relationship distance in the first exemplary embodiment of the present invention.

FIG. 4 is a view illustrating a second specific example of the calculation method for the discourse relationship distance in the first exemplary embodiment of the present invention.

In the second specific example, the discourse relationship information of the target text stores simple sentences A1, A2, A3, and A4 in this order from a head thereof. The discourse relationship information of the hypothesis text stores simple sentences B1, B2, and B3 in this order from a head thereof. The simple sentence B1 is related to the simple sentence A2. The simple sentence B2 is related to the simple sentence A3. The simple sentence B3 is related to the simple sentence A4.

In this case, the second calculation unit 106 selects the simple sentence B1 in step S8. The simple sentence B1 is a head simple sentence in the discourse relationship information of the hypothesis text, so that there is no simple sentence that is stored before the simple sentence B1. Thus, the second calculation unit 106 determines in step S10 that there is no crossing point for the simple sentence B1.

Then, the second calculation unit 106 selects the simple sentence B2 in step S8. In the discourse relationship information of the target text, the simple sentence A4 is stored after the simple sentence A3 related to the simple sentence B2. In the discourse relationship information of the hypothesis text, the simple sentence B1 is stored before the simple sentence B2. There is no correspondence relationship between the simple sentences A4 and B1. Thus, the second calculation unit 106 determines in step S10 that there is no crossing point for the simple sentence B2.

Then, the second calculation unit 106 selects the simple sentence B3 in step S8. The simple sentence A4 related to the simple sentence B3 is the last simple sentence in the discourse relationship information of the target text, so that there is no simple sentence that is stored after the simple sentence A4. Thus, the second calculation unit 106 determines in step S10 that there is no crossing point for the simple sentence B3.

That is, it can be seen that the discourse relationship distance in the second specific example is 0 and that the target and hypothesis texts have the same discourse relationship.

Figure 5:
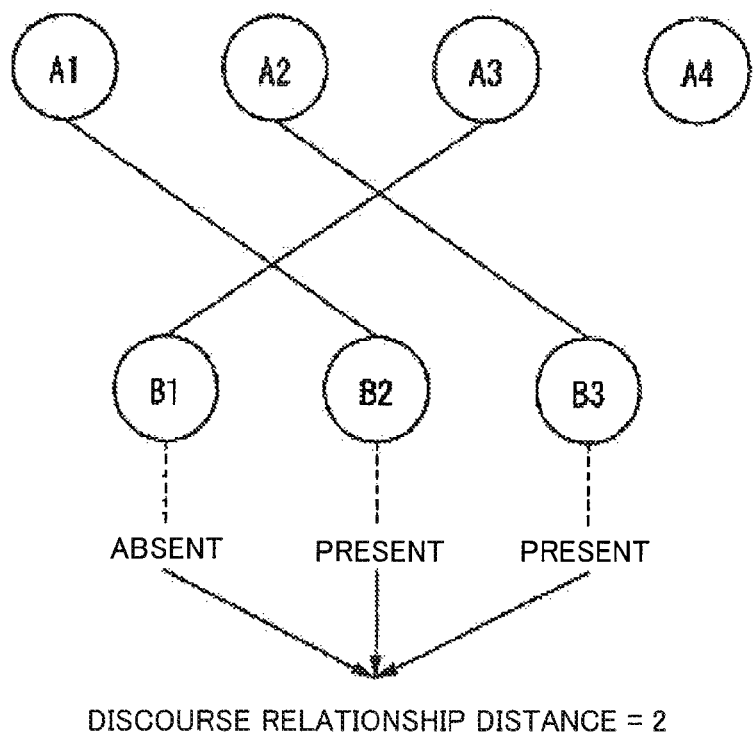
FIG. 5 is a view illustrating a third specific example of the calculation method for the discourse relationship distance in the first exemplary embodiment of the present invention.

FIG. 5 is a view illustrating a third specific example of the calculation method for the discourse relationship distance in the first exemplary embodiment of the present invention.

In the third specific example, the discourse relationship information of the target text stores simple sentences A1, A2, A3, and A4 in this order from a head thereof. The discourse relationship information of the hypothesis text stores simple sentences B1, B2, and B3 in this order from a head thereof. The simple sentence B1 is related to the simple sentence A3. The simple sentence B2 is related to the simple sentence A1. The simple sentence B3 is related to the simple sentence A2.

In this case, the second calculation unit 106 selects the simple sentence B1 in step S8. The simple sentence B1 is a head simple sentence in the discourse relationship information of the hypothesis text, so that there is no simple sentence that is stored before the simple sentence B1. Thus, the second calculation unit 106 determines in step S10 that there is no crossing point for the simple sentence B1.

Then, the second calculation unit 106 selects the simple sentence B2 in step S8. In the discourse relationship information of the target text, the simple sentences A2, A3, and A4 are stored after the simple sentence A1 related to the simple sentence B2. In the discourse relationship information of the hypothesis text, the simple sentence B1 is stored before the simple sentence B2. In this example, the simple sentences A3 and B1 have a correspondence relationship. Thus, the second calculation unit 106 determines in step S10 that there is a crossing point for the simple sentence B2.

Then, the second calculation unit 106 selects the simple sentence B3 in step S8. In the discourse relationship information of the target text, the simple sentences A3 and A4 are stored after the simple sentence A2 related to the simple sentence B3. In the discourse relationship information of the hypothesis text, the simple sentences B1 and B2 are stored before the simple sentence B3. The simple sentences A3 and B1 have a correspondence relationship. Thus, the second calculation unit 106 determines in step S10 that there is a crossing point for the simple sentence B3.

That is, the discourse relationship distance in the third specific example is 2.

Figure 6:
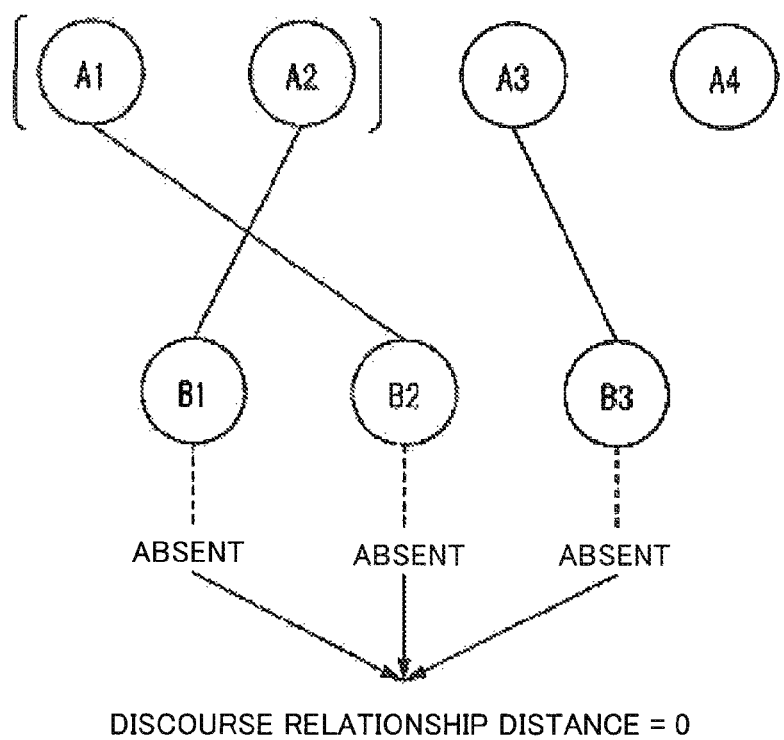
FIG. 6 is a view illustrating a fourth specific example of the calculation method for the discourse relationship distance in the first exemplary embodiment of the present invention.

FIG. 6 is a view illustrating a fourth specific example of the calculation method for the discourse relationship distance in the first exemplary embodiment of the present invention.

In the fourth specific example, the discourse relationship information of the target text stores simple sentences A1, A2, A3, and A4 in this order from a head thereof. In the target text, the simple sentences A1 and A2 have a paraphrase relationship. The discourse relationship information of the hypothesis text stores simple sentences B1, B2, and B3 in this order from a head thereof. The simple sentence B1 is related to the simple sentence A2. The simple sentence B2 is related to the simple sentence A1. The simple sentence B3 is related to the simple sentence A3.

In this case, the second calculation unit 106 selects the simple sentence B1 in step S8. The simple sentence B1 is a head simple sentence in the discourse relationship information of the hypothesis text, so that there is no simple sentence that is stored before the simple sentence B1. Thus, the second calculation unit 106 determines in step S10 that there is no crossing point for the simple sentence B1.

Then, the second calculation unit 106 selects the simple sentence B2 in step S8. In the discourse relationship information of the target text, the simple sentences A3 and A4 are stored after the simple sentence A1 related to the simple sentence B2. That is, the simple sentence A2 is stored in the same index as the simple sentence A1 and is thus not counted as the simple sentence that is stored after the simple sentence A1. A simple sentence in the discourse relationship information of the hypothesis text that is stored before the simple sentence B2 is the simple sentence B1. In the discourse relationship information of the hypothesis text, the simple sentence B1 is stored before the simple sentence B2. Neither the simple sentences A3 nor A4 have correspondence relationship with the simple sentence B1. Thus, the second calculation unit 106 determines in step S10 that there is no crossing point for the simple sentence B2.

Then, the second calculation unit 106 selects the simple sentence B3 in step S8. In the discourse relationship information of the target text, the simple sentence A4 is stored after the simple sentence A3 related to the simple sentence B3. In the discourse relationship information of the hypothesis text, the simple sentences B1 and B2 are stored before the simple sentence B3. The simple sentence A4 has no correspondence relationship with both the simple sentences B1 and B2. Thus, the second calculation unit 106 determines in step S10 that there is no crossing point also for the simple sentence B3.

That is, it can be seen that the discourse relationship distance in the fourth specific example is 0 and that the target and hypothesis texts have the same discourse relationship. As described above, even when the order of two simple sentences having a paraphrase relationship is reversed between the target and hypothesis texts, the entailment evaluation device 100 according to the present exemplary embodiment can adequately perform entailment evaluation.

<Second Exemplary Embodiment>

A second exemplary embodiment of the present invention will be described in detail below.

An entailment evaluation device 100 according to the second exemplary embodiment differs from that of the first exemplary embodiment in the discourse relationship distance calculation method performed by the second calculation unit 106.

The second calculation unit 106 according to the second exemplary embodiment adds a weight based on the simple sentence distance to the crossing point determined in step S10. Then, the second calculation unit 106 calculates the number of the weighted crossing points as the discourse relationship distance. Here, an example of weighting based on the simple sentence distance will be described. Assume that there exist a first combination and a second combination crossing the first combination. The first combination includes a first simple sentence of the hypothesis text and a second simple sentence of the target text related to the first simple sentence. The second combination includes a third simple sentence of the hypothesis text and a fourth simple sentence of the target text related to the third simple sentence. In this case, as the weighting for the first combination, a value obtained by adding a value obtained by subtracting the simple sentence distance of the first combination, i.e., between the first and second simple sentences from 1 and a value obtained by subtracting the simple sentence distance of the second combination, i.e., between the third and fourth simple sentences from 1 is used.

Figure 7:
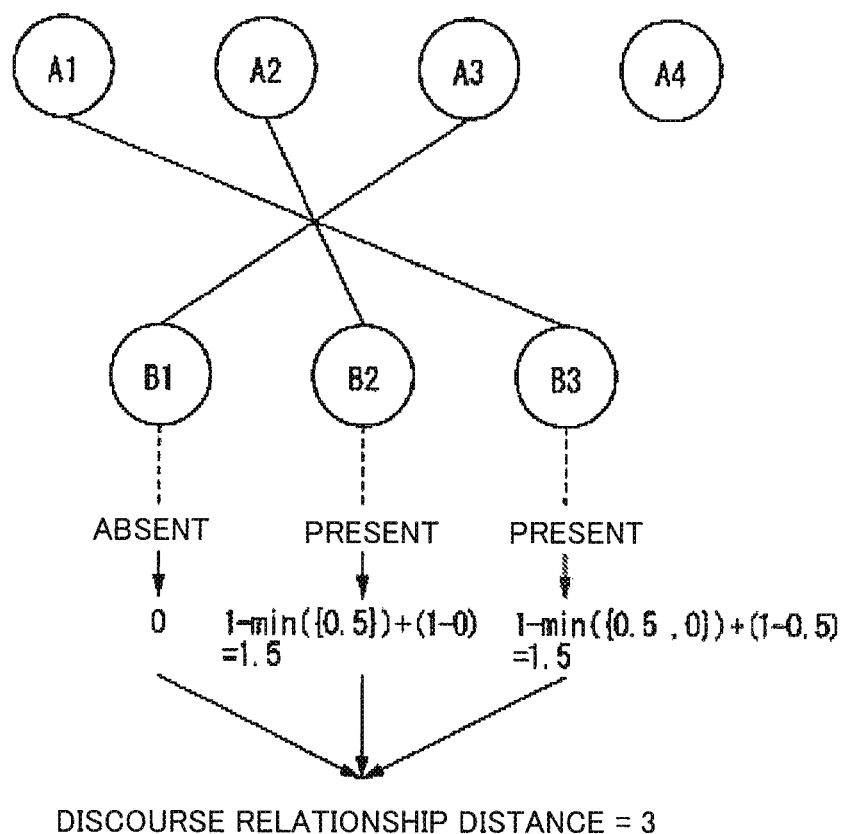
FIG. 7 is a view illustrating a specific example of the calculation method for the discourse relationship distance in a second exemplary embodiment of the present invention.

FIG. 7 is a view illustrating a specific example of the calculation method for the discourse relationship distance in the second exemplary embodiment of the present invention.

In the specific example in the second exemplary embodiment, the discourse relationship information of the target text stores simple sentences A1, A2, A3, and A4 in this order from a head thereof. The discourse relationship information of the hypothesis text stores simple sentences B1, B2, and B3 in this order from a head thereof. The simple sentence B1 is related to the simple sentence A3. The simple sentence B2 is related to the simple sentence A2. The simple sentence B3 is related to the simple sentence A1. The simple sentence distance between the simple sentences B1 and A3 is 0.5, simple sentence distance between the simple sentences B2 and A2 is 0, and simple sentence distance between the simple sentences B3 and A1 is 0.5.

In this case, the second calculation unit 106 selects the simple sentence B1 in step S8. The simple sentence B1 is a head simple sentence in the discourse relationship information of the hypothesis text, so that there is no simple sentence that is stored before the B1. Thus, the second calculation unit 106 determines in step S10 that there is no crossing point for the simple sentence B1.

Then, the second calculation unit 106 selects the simple sentence B2 in step S8. In the discourse relationship information of the target text, the simple sentences A3 and A4 are stored after the simple sentence A2 related to the simple sentence B2. In the discourse relationship information of the hypothesis text, the simple sentence B1 is stored before the simple sentence B2. The simple sentences A3 and B1 have a correspondence relationship. The second calculation unit 106 adds 0.5 obtained by subtracting the simple sentence distance 0.5 between the simple sentences A3 and B1 from 1 and 1 obtained by subtracting the simple sentence distance 0 between the simple sentences A2 and B2 from 1. From such a calculation, the second calculation unit 106 obtains 1.5 as the discourse relation distance for the simple sentence B2.

Then, the second calculation unit 106 selects the simple sentence B3 in step S8. In the discourse relationship information of the target text, the simple sentences A2, A3 and A4 are stored after the simple sentence A1 related to the simple sentence B3. In the discourse relationship information of the hypothesis text, the simple sentences B1 and B2 are stored before the simple sentence B3. The simple sentences A3 and B1 have a correspondence relationship. Further, the simple sentences A2 and B2 have a correspondence relationship. The second calculation unit 106 selects a smaller one of the simple sentence distance 0.5 between the simple sentences A3 and B1 and simple sentence distance 0 between the simple sentences A2 and B2. That is, the second calculation unit 106 selects the simple sentence distance 0 between the simple sentences A2 and B2. The second calculation unit 106 adds 1 obtained by subtracting the simple sentence distance 0 between the simple sentences A2 and B2 from 1 and 0.5 obtained by subtracting the simple sentence distance 0.5 between the simple sentences A1 and B3 from 1. From such a calculation, the second calculation unit 106 obtains 1.5 as the discourse relation distance for the simple sentence B3.

The second calculation unit 106 totalizes the discourse relationship distances of the simple sentences to calculate the discourse relationship distance between the target and hypothesis texts.

That is, the discourse relationship distance in this specific example is 3.

As described above, according to the second exemplary embodiment, the second calculation unit 106 increases the discourse relationship distance as the simple sentence distance is smaller, that is, as the similarity of meaning between a combination of the simple sentences of the target and hypothesis texts which have a correspondence relationship with each other becomes higher, when a crossing occurs between the combination of the simple sentences and another combination of the simple sentences of the target and hypothesis texts. That is, when no crossing occurs for the similar simple sentence, the discourse relationship distance becomes smaller. Thus, the entailment evaluation device 100 can perform entailment evaluation more adequately.

In the second exemplary embodiment, a method that subtracts the simple sentence distance from 1 is used as the calculation method for the weight to be added to the crossing point. However, the present invention is not limited to this. Any other methods, such as a method that takes the inverse of the simple sentence distance, may be used as long as they calculate the weight that monotonously decreases with respect to the simple sentence distance.

<Third Exemplary Embodiment>

A third exemplary embodiment of the present invention will be described in detail below.

Figure 8:
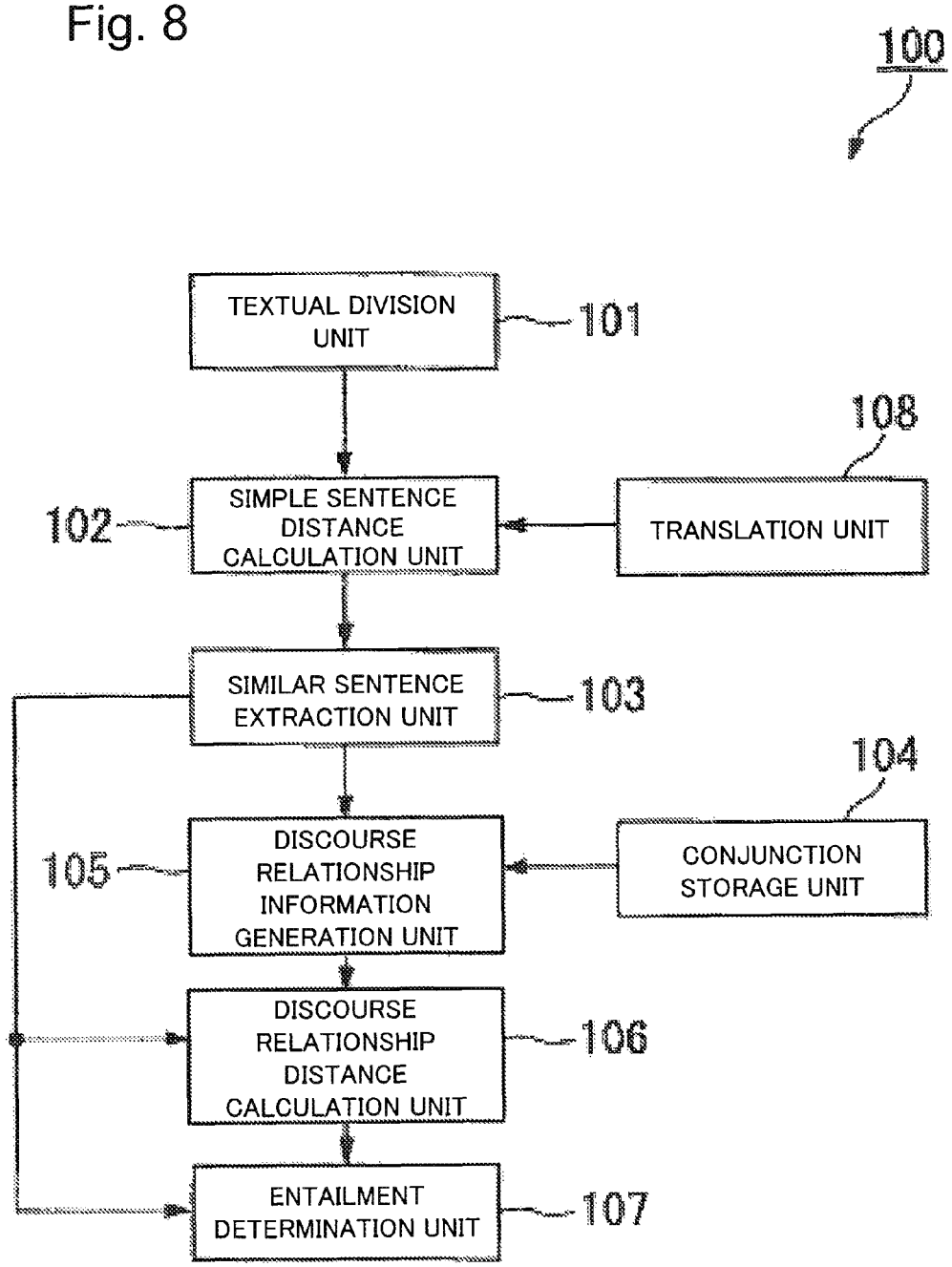
FIG. 8 is a schematic block diagram illustrating a configuration of an entailment evaluation device according to a third exemplary embodiment.

FIG. 8 is a schematic block diagram illustrating a configuration of an entailment evaluation device 100 according to the third exemplary embodiment.

The entailment evaluation device 100 according to the third exemplary embodiment includes, in addition to the components of the first exemplary embodiment, a translation unit 108. When different languages are used to describe the target text and the hypothesis text, respectively, the translation unit 108 makes the languages of the simple sentences obtained by division performed by the division unit 101 identical. That is, the translation unit 108 translates the simple sentences obtained by division of the target text into a language of the hypothesis text. Alternatively, the translation unit 108 translates the simple sentences obtained by division of the hypothesis text into a language of the target text. The first calculation unit 102 calculates the simple sentence distance between the translated simple sentences.

As described above, according to the third exemplary embodiment, when different languages are used to describe the target and hypothesis texts, respectively, the entailment evaluation device 100 can achieve the entailment evaluation. In particular, the translation is done for each simple sentence obtained by division performed by the division unit 101, thereby making it possible to reduce mistranslation.

The first calculation unit 102 calculates the simple sentence distance based on a word overlapping rate, etc. Thus, the first calculation unit 102 need not translate whole sentence. That is, the first calculation unit 102 may perform the translation for each word of the simple sentence by using, e.g., a bilingual dictionary.

The exemplary embodiments of the present invention have been described in detail with reference to the drawings. However, specific configurations are not limited to these exemplary embodiments, and design modifications may be made without departing from the scope of the invention.

For example, in the above exemplary embodiments, the discourse relationship distance is calculated based on the number of the crossing points. However, the present invention is not limited to this. Any other methods may be used, in which the discourse relationship distance monotonously increases with respect to the number of the simple sentences which do not coincide in terms of the discourse relationship. For example, the number of times of rearrangement required to make the discourse relationship information of the target text identical to that of the hypothesis text in terms of chronological order may be used as the discourse relationship distance.

In the above exemplary embodiments, the entailment evaluation is performed by the determination unit 107 using the sum of the total sum of the simple sentence distances and discourse relationship distance. However, the present invention is not limited to this. For example, the determination unit 107 may perform the entailment evaluation using a product of the total sum of the simple sentence distances and discourse relationship distance. The determination unit 107 may perform the entailment evaluation using the sum or product after normalizing each of the total sum of the simple sentence distances and discourse relationship distance to a value equal to or larger than 0 and equal to or smaller than 1.

In the above exemplary embodiments, the entailment evaluation device 100 performs the entailment evaluation using, as a scale of the simple sentence and discourse relationship, the distance indicating a degree of dissimilarity. However, the present invention is not limited to this. The entailment evaluation device 100 may perform the entailment evaluation using similarity between the simple sentences and between the discourse relationships. The distance indicating the dissimilarity is a value indicating higher similarity as the distance becomes closer to 0, and the similarity is a value indicating higher similarity as the distance becomes closer to 1. Thus, the entailment evaluation using the distance and entailment evaluation using the similarity are equivalent.

In the above exemplary embodiments, the generation unit 105 rearranges, based on the conjunction connecting the simple sentences, the array in which the simple sentences are arranged in the order of appearance to generate the discourse relation information. However, the present invention is not limited to this. In general text, the simple sentences are arranged in the order of occurrence of events. Thus, when the target and hypothesis texts are such a type of text, the entailment evaluation device 100 can adequately the entailment evaluation even by using, as the discourse relationship information, the array in which the simple sentences are arranged in the order of appearance as it is.

<Fourth Exemplary Embodiment>

Figure 9:
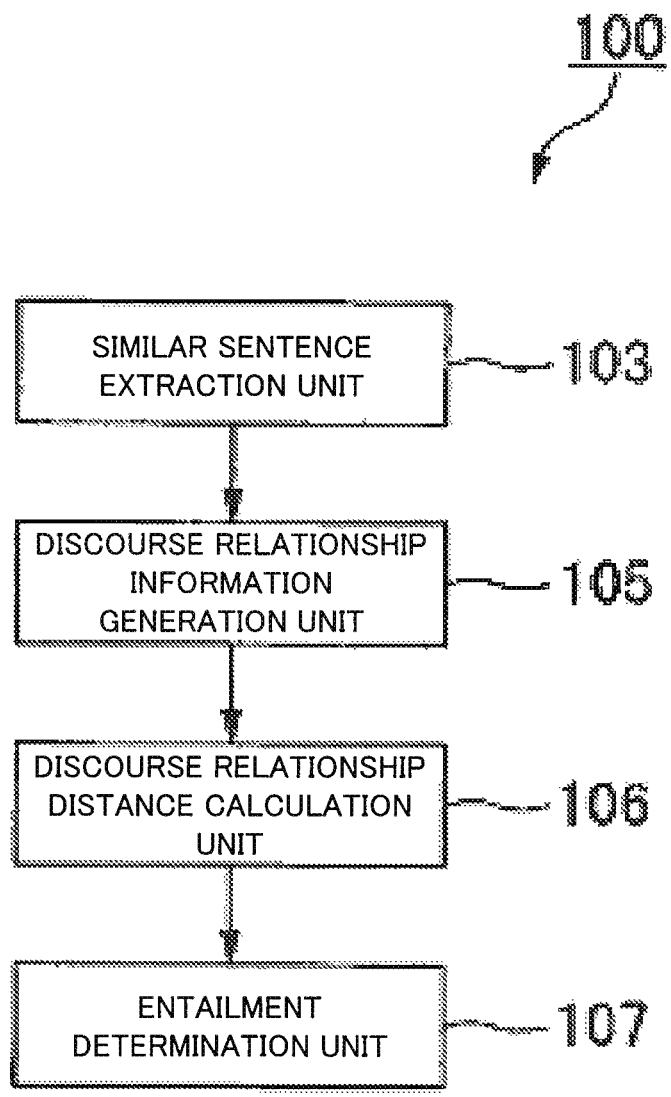
FIG. 9 is a schematic block diagram illustrating a configuration of an entailment evaluation device according to a fourth exemplary embodiment of the present invention

FIG. 9 is a schematic block diagram illustrating a configuration of an entailment evaluation device 100 according to a fourth exemplary embodiment of the present invention. The entailment evaluation device 100 shown FIG. 9 is related to basic configuration of the entailment evaluation device according to First through Third Exemplary Embodiment.

The entailment evaluation device 100 according to the fourth exemplary embodiment of the present invention includes an extraction unit 103, a generation unit 105, a second calculation unit 106, and a determination unit 107.

The extraction unit 103 extracts, from the target text including a plurality of simple sentences, a simple sentence thereof similar in meaning to a simple sentence of the hypothesis text including a plurality of simple sentences.

The generation unit 105 generates, based on the order of appearance of the simple sentences, discourse relationship information indicating a discourse relationship between simple sentences of each of the hypothesis test and target text. The second calculation unit 106 calculates, based on the discourse relationship information, a discourse relationship distance which is a distance between the discourse relationship between the simple sentences included in the hypothesis text and discourse relationship between the simple sentences extracted by the extraction unit 103. The determination unit 107 determines, based on the discourse relationship distance, whether the target text entails the hypothesis text.

Thus, the entailment evaluation device 100 can determine that the target text does not entail the hypothesis text when the discourse relationship between the simple sentences of the hypothesis text and the discourse relationship between the simple sentences of the target text are not similar.

Note that entailment evaluation device 100 described above may have a computer system inside thereof. The computer system at least includes a CPU and a memory which controlled by the CPU. Further, the processing of each unit may be stored in a computer-readable recording medium in a form of computer program, and the above processing of each unit may be performed when the CPU of the computer reads out and execute the program. Here, the "computer-readable recording medium" may include a magnetic disk, a magneto-optical disk, a CD-ROM, a DVD-ROM, a semiconductor memory, etc. Further, the computer program may be transmitted to the computer via a communication line to allow a CPU of the computer receiving the transmission to execute the program.

The above program may be one for realizing a part of the above functions.

Further, the program may be a so-called differential file (differential program) that can realize the above functions in combination with a program that has been already recorded in the computer system.

The present invention has been described with reference to, but is not limited to, the above exemplary embodiments. It will be understood by those skilled in the art that various modification may be made to configurations and details without departing from the sprit and scope of the present invention defined by the claims.

This application is based upon and claims the benefit of priority from the Japanese Patent Application No 2013-039208, filed on Feb. 28, 2013 the entire contents of which are incorporated herein by reference.

Advantageous Effects of Invention

The present invention can be applied to an entailment evaluation device, an entailment evaluation method, and a program.

REFERENCE SIGNS LIST

100 Entailment evaluation device
101 Textual division unit (division unit)
102 Simple sentence distance calculation unit (first calculation unit)
103 Similar sentence extraction unit (extraction unit)
104 Conjunction storage unit (storage unit)
105 Discourse relationship information generation unit (generation unit)
106 Discourse relationship distance calculation unit (second calculation unit)
107 Entailment determination unit (determination unit)
108 Translation unit

What is claimed is:

1. An entailment evaluation device comprising:
   a generation unit configured to generate first information indicating at least an order of occurrence of events of first and second simple sentences included in a hypothesis text and generates second information indicating at least an order of occurrence of events of third and fourth simple sentences included in a target text, the third simple sentence being related to the first simple sentence, the fourth simple sentence being related to the second simple sentence;
   a calculation unit configured to obtain a calculation result by comparing, based on the first and second information, the order of occurrence of events of first and second simple sentences and the order of occurrence of events of third and fourth simple sentences; and
   a determination unit configured to determine, based on at least the calculation result, whether or not the target text entails the hypothesis text.

2. The entailment evaluation device according to claim 1, further comprising an extraction unit configured to extract, as the third simple sentence, a simple sentence similar in meaning to the first simple sentence from the target text.

3. The entailment evaluation device according to claim 1, further comprising a division unit configured to obtain,
   by dividing the hypothesis text, a plurality of simple sentences, including the first and second simple sentences, each having one predicate and
   obtain, by dividing the target text, a plurality of simple sentences, including the third and fourth simple sentences, each having one predicate.

4. The entailment evaluation device according to claim 1, further comprising a storage unit configured to store a first conjunction and an order of occurrence of events of simple sentences connected by the first conjunction in association with each other, wherein
   the generation unit determines whether or not the first conjunction and a second conjunction connecting the first and second simple sentences are identical and makes, when determining that the first and second conjunctions are identical, the order of the first and second simple sentences in the first information coincide with the order of occurrence of an event associated with the first conjunction.

5. The entailment evaluation device according to claim 1, further comprising a storage unit configured to store a first conjunction and an order of occurrence of events of simple sentences connected by the first conjunction in association with each other, wherein the generation unit
   determines whether or not the first conjunction and a second conjunction connecting the third and fourth simple sentences are identical and
   makes, when determining that the first and second conjunctions are identical, the order of the third and fourth simple sentences in the second information coincide with the order of occurrence of an event associated with the first conjunction.

6. The entailment evaluation device according to claim 1, wherein
   the extraction unit identifies a first simple sentence distance between the first and third simple sentences and a second simple sentence distance between the second and fourth simple sentences, and the determination unit determines, based on at least the calculation result and first and second simple sentence distances, whether or not the target text entails the hypothesis text.

7. The entailment evaluation device according to claim 1, wherein
the calculation unit determines whether or not the event of the second simple sentence occurs before the event of the first simple sentence and the event of the fourth simple sentence occurs after the event of the third simple sentence, and
the determination unit determines, when the event of the second simple sentence occurs before the event of the first simple sentence and the event of the fourth simple sentence occurs after the event of the third simple sentence, that the target text does not entail the hypothesis text.

8. The entailment evaluation device according to claim 1, wherein
the extraction unit calculates a first similarity in meaning between the first and third simple sentences and a second similarity in meaning between the second and fourth simple sentences,
the calculation unit determines whether or not the event of the second simple sentence occurs before the event of the first simple sentence and the event of the fourth simple sentence occurs after the event of the third simple sentence, and
the determination unit determines, when the first and second similarities are high, the event of the second simple sentence occurs before the event of the first simple sentence, and the event of the fourth simple sentence occurs after the event of the third simple sentence, that the target text does not entail the hypothesis text.

9. An entailment evaluation method comprising:
generating first information indicating at least an order of occurrence of events of first and second simple sentences included in a hypothesis text;
generating second information indicating at least an order of occurrence of events of third and fourth simple sentences included in a target text, the third simple sentence being related to the first simple sentence, the fourth simple sentence being related to the second simple sentence;
obtaining a calculation result by comparing, based on the first and second information, the order of occurrence of events of first and second simple sentences and order of occurrence of events of third and fourth simple sentences; and
determining, based on at least the calculation result, whether or not the target text entails the hypothesis text.

10. A non-transitory recording medium storing a program allowing a computer to execute:
generating first information indicating at least an order of occurrence of events of first and second simple sentences included in a hypothesis text;
generating second information indicating at least the order of occurrence of events of third and fourth simple sentences included in a target text, the third simple sentence being related to the first simple sentence, the fourth simple sentence being related to the second simple sentence;
obtaining a calculation result by comparing, based on the first and second information, the order of occurrence of events of first and second simple sentences and order of occurrence of events of third and fourth simple sentences; and
determining, based on at least the calculation result, whether or not the target text entails the hypothesis text.

* * * * *